GRAPHICAL DISPLAY PLOTTER

INVENTOR
ROBERT B. TROUSDALE
BY John A. Duffy
ATTORNEY.

INVENTOR.
ROBERT B. TROUSDALE
BY John A. Duffy
ATTORNEY.

INVENTOR.
ROBERT B. TROUSDALE
BY John A. Duffy
ATTORNEY.

3,425,038

GRAPHICAL DISPLAY PLOTTER

Robert B. Trousdale, Santa Ana, Calif., assignor to California Computer Products, Inc., Anaheim, Calif., a corporation of California Filed May 3, 1966, Ser. No. 554,925
U.S. Cl. 340—172.5 8 Claims
Int. Cl. G11b 9/00

ABSTRACT OF THE DISCLOSURE

An adaptor may be used in combination with a digital computer and incremental plotter so as to provide efficient utilization of both devices without modification of either. The adaptor must provide compatibility between the rates of operation of the computer and plotter and be responsive to, and generate from the input waveforms of each, the appropriate signals and timing relationships to effectuate the desired interchange between computer and plotter. In some systems, as for example when the IBM 360 is used as the computing device, the communication between computer and a plurality of plotters may be effectuated by a single channel via a time multiplexing operation.

This invention relates to a data processing system for presenting and displaying digital data in graphical form, and more particularly to a system for allowing a digital plotter to be operated directly from a digital computer.

Graphical display or recording devices such as incremental plotters are best operated when used in conjunction with a data processing system such as a digital computer. Full utilization of the capabilities of a high speed computer requires an adaptor between the computer and the graphical display device which is wholly compatible with both the computer and the graphical display device. Since the characteristics of current present day computers are so different from the characteristics of electro-mechanical display devices such as incremental plotters, some sort of intermediate adapting system is necessary to provide useable information to drive an incremental plotter from a digital computer.

The difficulties of the prior art systems for driving incremental plotters are derived primarily from an attempt to design a universal adaptor system to be compatible primarily with the digital computer. Such a design, while compatible with the characteristics of the computer, is wholly incompatible with the characteristics of the incremental plotter. Thus, digital incremental plotters, being relatively inexpensive, simple, and reliable, are not especially adaptable to accept data from a high speed digital computer. To provide an adaptor to make an incremental plotter compatible with a computer would invariably tend to multiply the complexity and cost of either the plotter or the adaptor. Furthermore, many of today's sophisticated digital computers are designed to operate in a manner wholly incompatible with a plotter, such as, for example, one that requires an exchange of signals from the plotter to the computer or the observation of special timing relationships between the computer and the incremental plotter. The signal exchange requirements are normally unique for each type or model of computer. It is, of course, essential that the use of an incremental plotting system not impose any special requirements on the programming operations of the digital computer or any modification of the arrangement or circuitry of the computer. Accordingly, there exists a need for an adaptor which is capable of unifying and combining the parts and function of a digital computer with that of a digital incremental plotting system, utilizing the existing characteristics of each to the best advantage, but without changing the structure or principle of operation of either. Such an adaptor should provide compatibility between the rates of operation of the computer and the plotter and adjust the wave shapes, signal levels and timing relationships of the signals interchanged between the plotter and the computer so that there is no reduction in reliability. Further, it may be necessary to permit a computer to use maximum calculating time, operating essentially independently of the plotter after a command has been given to the plotter. The instructional commands for the plotter should be converted from the format of the computer to a different format which can be accepted by the plotter, and the wave shape, signal level and timing relationships should be adjusted as well.

In some of today's highly sophisticated digital computers, such as, for example, the IBM System/360 group, there is a special need for a simple, efficient and reliable adaptor between the System/360 and a digital incremental plotter. This is desired because of the very special characteristics of a System/360 computer which, among other things, provides such an intricate relationship between all of the output devices operated by the computer. Accordingly, it is an object of this invention to provide an improved graphical data presentation system for an IBM System/360 digital computer.

It is another object of this invention to provide an improved graphical data presentation system for a digital computer, to an incremental plotter.

It is another object of this invention to provide means for achieving cooperation between a digital incremental plotter and a digital computer, which means permits the computer to drive a plotter directly without modification of either the computer or the plotter.

According to the device of the invention, variable controlled plotting motions of a digital incremental plotter are provided through combinations of unique movements derived from individual binary coded representations provided from a digital computer. Means are additional provided for effecting positive control of the plotter and for synchronization of the various plotter operating mechanisms while rapidly releasing the computer for further calculations.

According to a principal aspect of the invention, commands are provided from an IBM System/360 digital computer for a digital incremental plotter in such a fashion as to require synchronization of the rates of operation of the plotter. Means are provided to store the commands for the plotter for energizing the three plotting axis mechanisms which additionally return the necessary control signals required by the computer to quickly release the computer for operation with other systems connected to the computer. A successive plotter operating command is not transferred to the plotting mechanisms until completion of a variable time interval which is determined by the command itself. The X and Y axis mechanisms and a relatively slower Z axis mechanism are thereby operated at their maximum rates automatically. Similarly, the computer can utilize a maximum of calculating time between plotter commands. The computer is furthermore enabled to utilize its peculiar characteristics independant of the plotter during operation without the plotter.

A better understanding of the invention may be had by reference to the following description taken in conjunction with the accompanying drawings of which:

Figure 1:
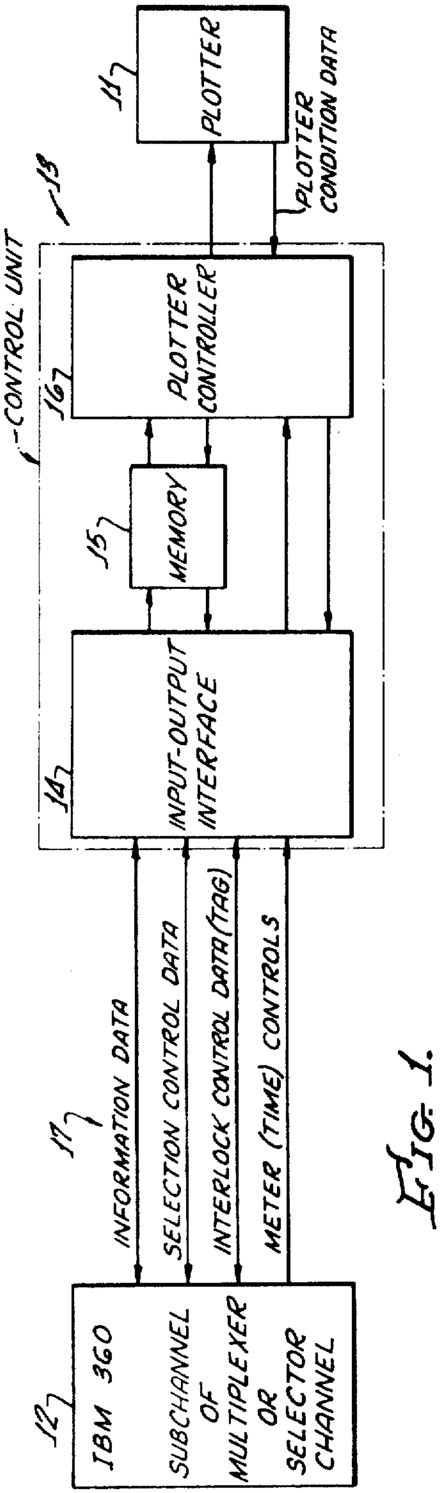
FIGURE 1 is a block diagram representation of a complete organization of the system including a subchannel of an IBM System/360 computer and digital incremental plotter.

Referring now to the block diagram of FIG. 1, there is illustrated a general arrangement of a complete system for preparing graphical records of an arbitrary nature and plotting them on an incremental digital plotter 11. The plotter 11 is a standard incremental plotter which may be used with other data processing systems and other equipment. Such a plotter is illustrated for example in Patent No. 3,199,111. The data processing system 12 is an IBM System/360 type computer with the processor 12 representing a subchannel of a multiplexer channel or a selector channel.

An IBM System/360 computer communicates with output devices, such as a plotter, through channels. In one specific operation, a subchannel 12 of a multiplexer channel of the IBM 360 is utilized to communicate with the incremental plotter 11 as illutrated in FIG. 1. The channel 12 basically provides signals and directs the flow of information between the main processing unit of the computer and input/output devices such as the plotter 11. Signals are provided by the channel 12 according to a multiplexing operation wherein all communications to and from the channel occur over a common bus. That is, any signal provided by the channel is available to all control units and input/output devices. Therefore, any signal provided by the channel is available to all input/output devices. At one instant, however, only one output device can be logically connected to the multiplexer channel 12. In the diagram of FIG. 1 only one output device, the incremental plotter 11, is shown connected to the channel 12. It is to be realized that, in accordance with the operation of the IBM 360, many other output devices can be connected thereto but are not shown since they are not a part of this invention.

The multiplexing facilities of the channel 12 therefore permit the possibility of operating any number of input/outputs devices including the incremental plotter 11 on a single interface. Portions of various messages can be transmitted over the interface in an interleaved fashion to and from different input/output devices including the incremental plotter 11, or a complete message can be transmitted in a single interface operation. Information travels from the channel 12 to a control unit 13 consisting of an input/output interface 14, a memory 15, which is optional, and a plotter control 16. Input/output interface lines 17 connect the channel 12 with the input/output interface 14. The lines 17 include all of the information necessary for the operation of the IBM 360 and the communication between the plotter 11 and the channel 12. Inasmuch as the IBM 360 system is well known and widely used its details and arrangements need not be further described here. In the use of any input/output equipment with the IBM 360, jumper connections and electronic system connections obvious to those familiar with the IBM 360 system are made at the control panel to insure proper operation and are not shown here since they are not part of the invention. Suffice it to say that as far as the control unit 13 and plotter 11 are concerned, the output lines 17 receive from the channel 12 all that is necessary for operation of the system as illustrated in FIG. 1.

The interface lines 17 includes information data out lines which are used to transmit information including the data necessary to drive the incremental plotter 11. The information data out lines can include the data, the plotter address and other commands. The information data in lines are used to transmit information from the incremental plotter 11 back to the channel 12. The selection control data is used for selecting the plotter 11. The interlock and control tag lines are used for interlocking and controlling information on the lines. The time control lines are used to control the operation of running-time meters in the plotter controller as well as in the 360 computer.

Lines 17 communicate directly with the input/output interface 14 which in turn is connected to control plotter control 16 through memory 15 in one aspect with plotter control 16 controlling the operation of the plotter 11. Communication between the channel 12 and the interface 14 is controlled in accordance with the operation of the IBM 360 system, which need not be described in full here. Basically, the channel 12 operates in a multiplexing operation in which any number of input/output devices may be operated concurrently on a single interface line 17 with portions of various messages transmitted over the lines 17 in an interleaved fashion. Each control unit, such as control unit 13, however, remains logically connected to the channel 12 through the lines 17 until information is transferred completed from the channel 12 to the control unit 13, or until the control unit 13 signals the channel 12 to disconnect.

Operation between the channel 12 and the input/output interface 14 over the lines 17 is conducted with the rise and fall of signals over the lines transmitted over the lines 17 being controlled by interlocked responses between the interface 14 and the channel 12. The interlocking removes the dependence of the operation on speed and makes it applicable to a wide variety of circuits and data rates. More specifically, the information data out lines are used to transmit addresses, commands, control orders and data to the control unit 13 through the interface 14. The information data in lines are used to transmit addresses, status, sense information and data from the control unit 13 back to the channel 12. The selection control line is used to select the particular control unit such as the control unit 13 in FIG. 1. The interlock control lines or "tags" are used for interlocking and controlling the information on the other lines 17. The metering control lines provide running time meter control.

Figure 2:
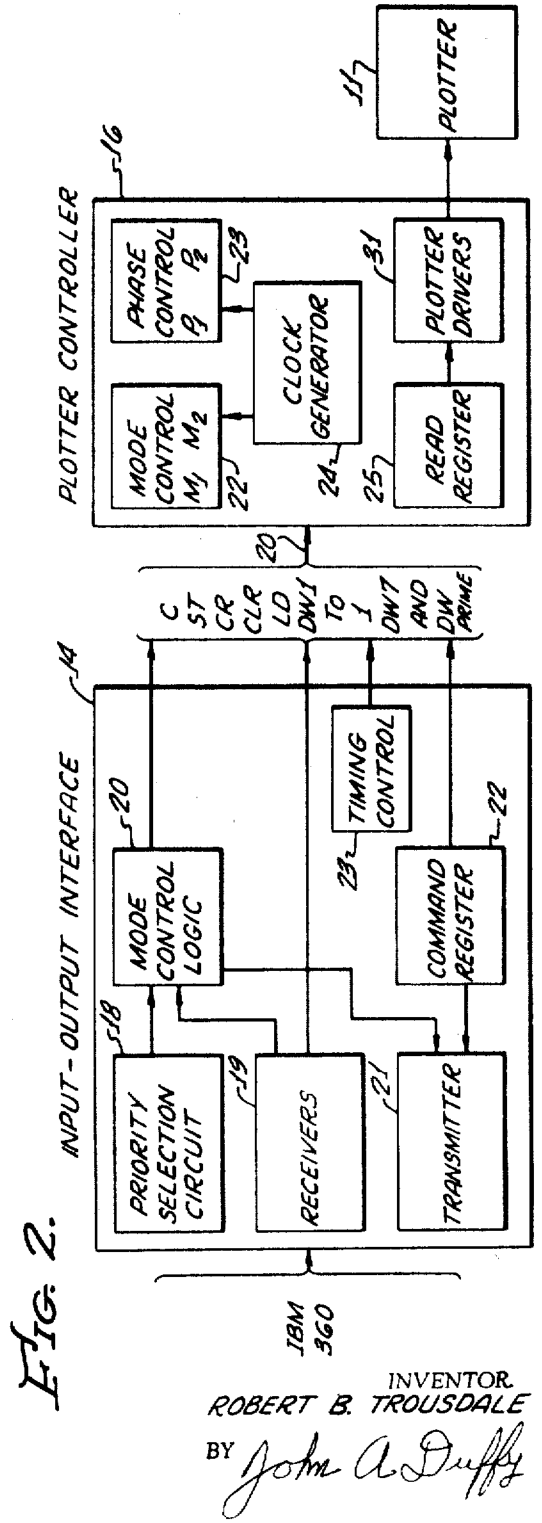
FIGURE 2 is a block diagram representation of the input/output interface and plotter controller of the invention.

Referring now to FIG. 2, a more detailed schematic block diagram is illustrated showing the operation of the input/output interface 14 with the plotter controller 16. Basically, the interface 14 responsive to the data lines 17 from the channel 12 of FIG. 1 provides the logical and timing control and provides signals to the plotter controller 16. The input/output interface 14 includes receivers 19 which are responsive to the information data out lines and the interlock control tag lines. The receivers 19 transmit information on to the plotter controller 16. The priority selection circuit 18 in the interface 14 is responsive to the selection control data line of the lines 17 for selecting the plotter controller 16 and plotter 11 of FIG. 1. A mode control logic 20 in the interface 14 operates to control the various modes of operation in accordance with the requirements of the channel 12 of FIG. 1. A transmitter 21 responsive to mode control logic 20 and a command register 22 transmit information back to the channel 12 of FIG. 1. through the information data in lines and selection control tag lines. A timing control 23 provides a clock signal at a predetermined rate to all of the logic operations including the plotter control 16 of the control unit 13. Detailed operation of the input/output interface 14 is not described herein since it is basically in accordance with the specifications of each IBM 360 system and is not a part of this invention.

The output signals from the interface 14 in FIG. 2 include a clock signal emanating from the timing control 23, an ST signal indicating a start command, a CR signal indicating an operation complete command, a CLR signal indicating a clear command, and an LD signal indicating a load command. Additionally, the signals DW1 and DW7 and their complements are fed to the controller 16 indicating the codes for operation of the plotter 11.

The plotter controller 16 in FIG. 2 responsive to the above named signals provides the necessary mode and phase control to provide signals to the plotter 11 through plotter drivers 31 in the plotter control 16, a mode control 22 and a phase control 27. A clock generator 24 responsive to the timing control 23 and the input interface 14 provides necessary timing control to the mode control 22 and phase control 27. A read register 25 responsive to the signals DW1 to DW7 provides the necessary storage to provide buffering of data to the plotter drivers 31.

Figure 3:
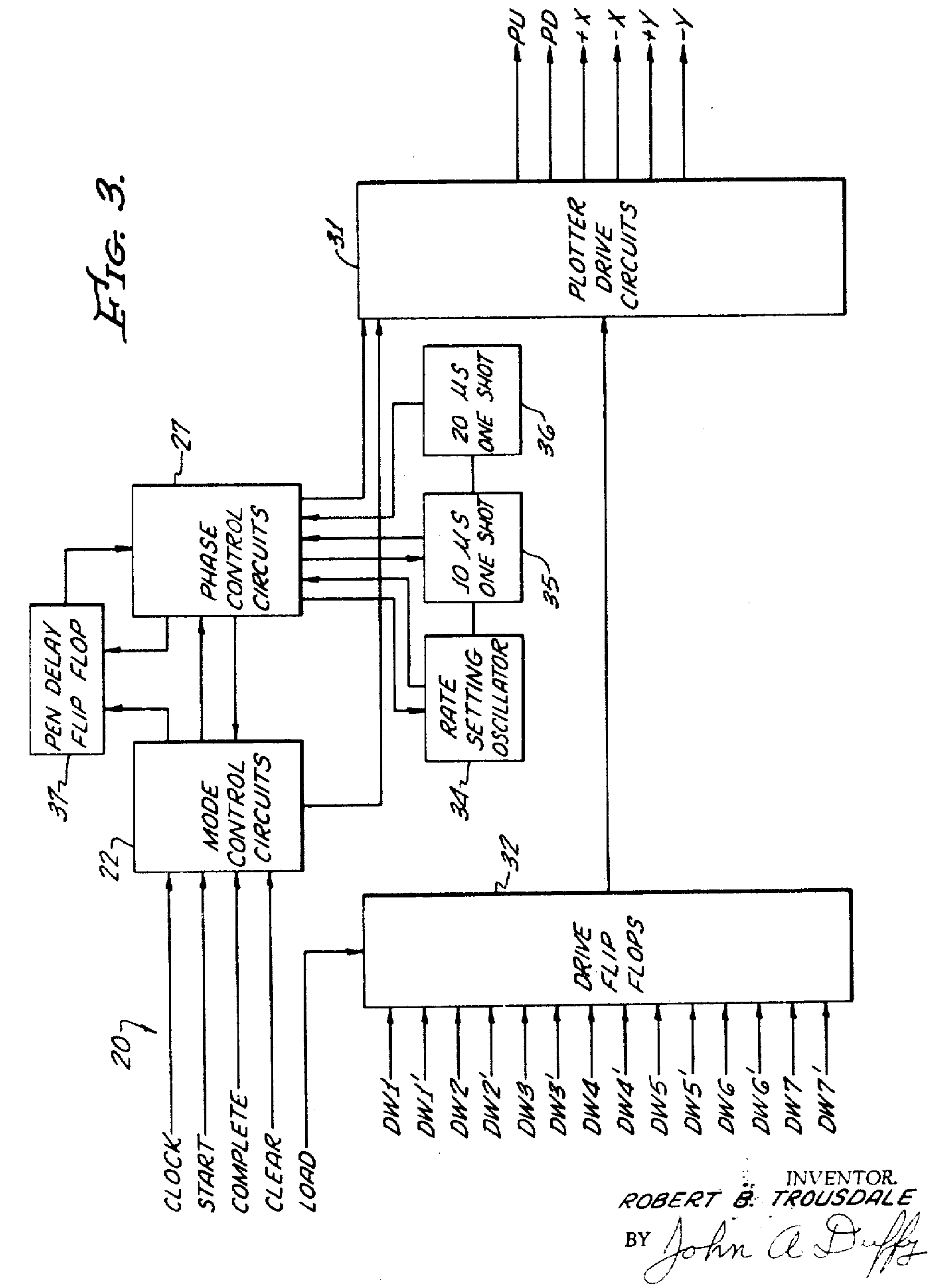
FIGURE 3 is a schematic block diagram representing the plotter controller of the invention.

Referring now to FIG. 3 there is illustrated in more detail a schematic block diagram of the plotter controller 16 of FIGS. 1 and 2. In FIG. 3 drive flip-flops 32 are connected to be responsive to a load signal from the channel 12 of FIG. 1 and provide the command codes to the plotter drive circuits 31. The plotter drive circuits 31 logically decode the command signals from the flip-flops 32 and provide the drive signals pen-up, pen down, +X, —X, +Y, and —Y to the plotter 11 of FIGS. 1 and 2, which drive the plotter 11 in accordance with the description contained in the above-referred-to Patent No. 3,199,-111. The plotter drive circuits 31 additionally are responsive to the mode control and phase control circuits 22 and 27. The timing control is derived from a rate setting oscillator 34, a ten microsecond one-shot 35, and a twenty microsecond one-shot 36 which provide the necessary timing control to the mode control circuits 22 and phase control circuits 23. Additionally, a pen control flip-flop 37 provides a necessary interlock control for two pen delay one-shots. The mode control circuits 22 are responsive to a clock, start, complete, and clear signal from the input/output interface 14 of FIGS. 1 and 2.

Figure 4:
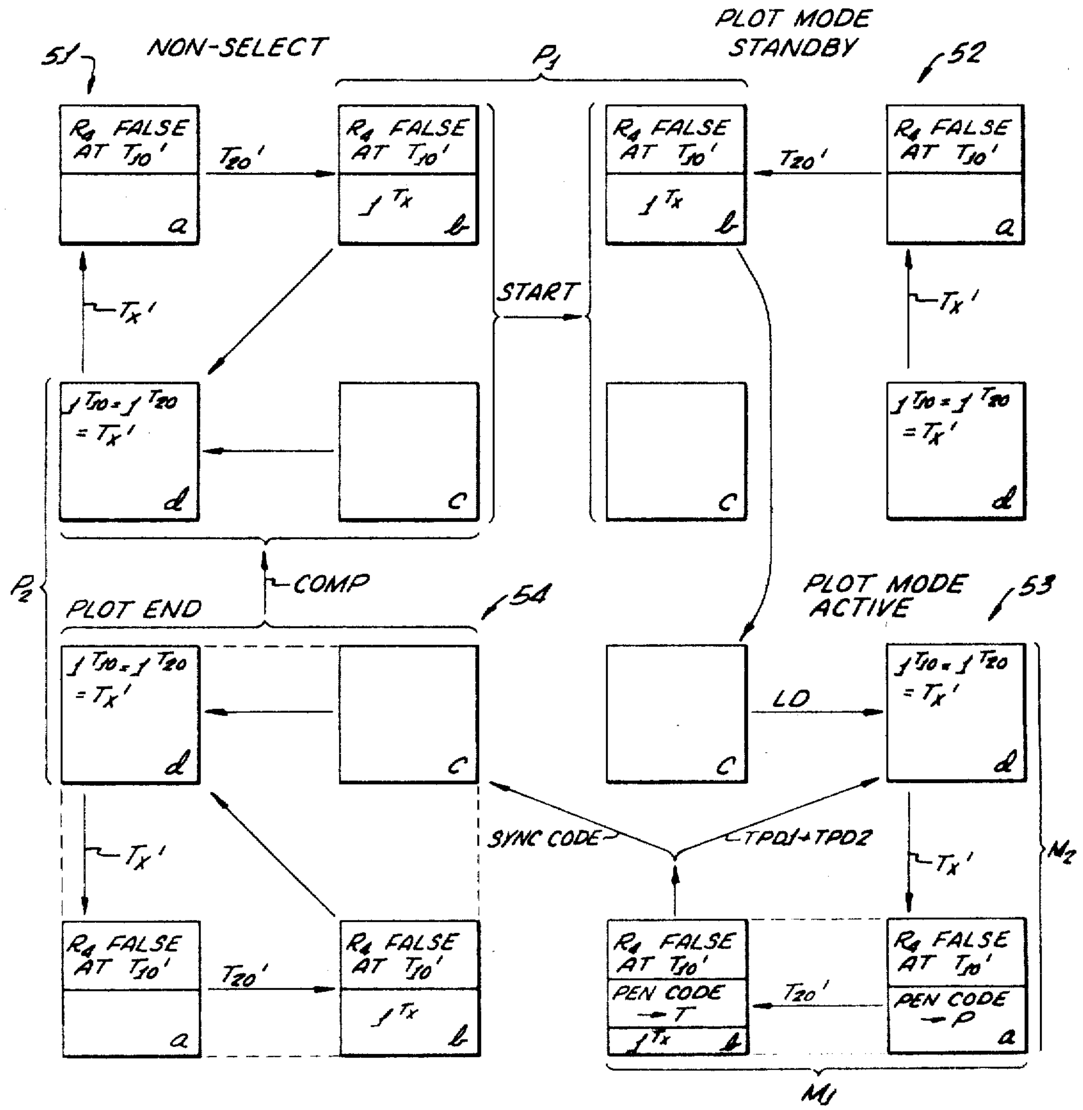
FIGURE 4 is a Vietch diagram representation of the operation of the complete system.

It is believed that a better description of the operation of the plotter controller 16 of FIG. 3 may be made in accordance with the Vietch diagram of FIG. 4 taken with the logical equations which govern the operation of the controller 13. The complete logical equations for the operation of the plotter controller 16 are as follows:

1M1=M2′ ST
0M1=M2 P2′ P1 DR6′ DR5 D321–+CLEAR
1M2=M1 P2′ P1
0M2=M1′ CR+CLEAR
1P1=P2′ T20′
0P1=P2 LD+M2′+M1′+P2′ TPD1+P2′ TPD2
1P2=P1
0P2=T10 T20+P1′ TX′
1T10=1T20=P2 P1 TX′
1TX=P2′ P1
1P=PEN–PDONE
0P=PEN–PDZERO
1TPD1=*dp/dt*
1TD2=*dp′/dt*
1DR1=LD DW1
0DR1=LD DW1′
1DR2=LD DW2
0DR2=LD DW2′
1DR3=LD DW3
0DR3=LD DW3′
1DR5=LD DW5
0DR5=LD DW5′
1DR6=LD DW6
0DR6=LD DW6′
1DR7=LD DW7
0DR7=LD DW7′
+X=A500XY* DR3′ DR1+A500XY* DR3′ DR2
—X=A500XY* DR3 DR1+A500XY* DR3 DR2
+Y=A500XY* DR3′ DR2′+A500XY*
(+DR3 DR2 DR1) 7DYP–A
—Y=A500XY* DR3 DR2′+ A500XY*
(+DR3′ DR2 DR1)7DYN–A
PU=PEN–DR2 DR1′
PD=PEN–DR2′ DR1
4A500XY*=M2 M1 P2′ DR5′
PEN–=M2 M1 P2′ DR6′ DR5 DR3′
D321=DR3 DR2 DR1

Referring now specifically to FIG. 3 and the accompanying Vietch diagram of FIG. 4, a description of the operation of the system will be made. The mode control and phase control circuits 22 and 27 of FIG. 3 operate in accordance with the diagram wherein, initially, the system is in operation in the nonselect box 51 of the diagram of FIG. 4 representing mode and phase control. Flow between the boxes of the Vietch diagram of FIG. 4 is controlled in accordance with the timing control of FIG. 3, wherein a one megacycle clock signal from Timing Control 23 of FIG. 2 provides a clock signal on lines 20 of FIGS. 2 and 3. Additionally, a rate setting oscillator 34 and one-shot multivibrators 35 and 36 of FIG. 3 generate signals $T_x$, $T_{10}$, and $T_{20}$ in accordance with the logic equations above. Basically, $T_x$ is the plot rate interval or time in which a full character may be processed from the channel 12 of FIG. 1 to the plotter 11. The oscillators 35 and 36 provide a $T_{10}$ signal and a $T_{20}$ signal, respectively, which allows time for the data from the 360 computer to the plotter to settle.

Initially, therefore, operation in accordance with the diagram of FIG. 4 commences in the boxes 51*a* through *d* of FIG. 4. In the nonselect box 51*a* the mode control flip-flops are in the logic state of M1′M2′. The phase control flip-flops circulate in the boxes 51*a*, 51*b*, and 51*d*. The $T_x$ times period delay circuit is triggered on in box 51*b*. Operation pauses in box 51*d* until $T_x$ times out, at which time, the mode switches to box 51*a*, simultaneously triggering 10 and 20 microsecond one-shots $T_{10}$ and $T_{20}$. Operation pauses again in box 51*a* until $T_{20}$ times out, and the mode switches to box 51*b*. This process continues until a start pulse is presented by the channel 12 to the mode control circuit 22 of FIG. 3 on the lines 20. The start pulse may occur at any time during the circulation within the boxes 51. Upon receipt of a start signal by the mode control circuits 22, the logic condition 1M1 is set and the operation moves from the boxes 51 to the boxes 52 of FIG. 4 which comprises the boxes 52*a*, *b*, *c* and *d*. The phase control circuits 27 circulate as illustrated in boxes 52*a*, *b*, *c* and *d* of FIG. 4 until the box 52*b* is reached. The operation shifts from the plot mode standby 52*b* to the plot mode active box 53*c* of FIG. 4. When the phase control circuits 27 reach the box 53*c* in FIG. 6, a data request signal is sent to the channel 12 from the input/output interface 14 of FIG. 1 through the interlock control data lines. This signal, in effect, requests a character signal from the 360 computer. The request is activated one bit time after the time period $T_x$ was set in box 52*b*. The computer then responds with a service out signal which becomes a load signal fed into the drive flip-flops 32 of FIG. 3. The operation then proceeds to the box 53*d* of FIG. 4 and through the boxes 53*a* to 53*b*, subject to timing control of the $T_x$ and $T_{20}$. During this time period the signals DW1 to DW7 of the drive flip-flops 31 are fed to the plotter drive circuits 31 and thence to the incremental plotter 11. That is, one character is fed to the incremental plotter. Following box 53*b*, the mode reverts to 53*c* where a data request signal is again sent to the channel 12 for the next plot character. This process continues for any desired sequence of characters. At the end of the period in the plot mode active 53 of FIG. 4, a unique sync code character is detected by the circuits 22 which causes the mode to proceed to the plot end box 54 of FIG. 4. Specifically, the sync character controls switching from box 53*b* to box 54*c* and thence to 54*d*, 54*a* and 54*b*. Operation proceeds in the boxes 54 at plot end until a complete signal is received by the mode control circuits 22 wherein the operation again proceeds to the nonselect box 51 where a new operation commences for the next character sequence to be received.

Figure 5:
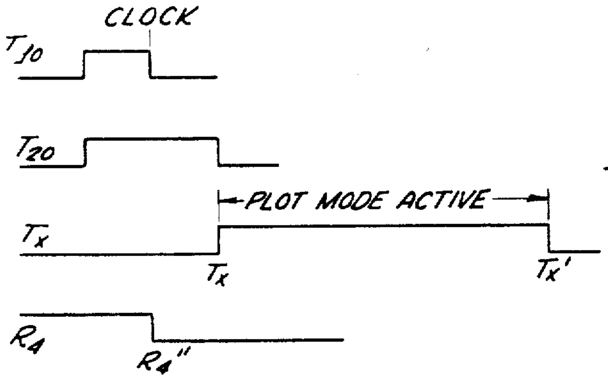
FIGURE 5 is a timing diagram showing the various wave forms provided in the operation of the system of FIG. 1.

Referring now to the timing diagram in FIG. 5, there is illustrated the waveforms of the timing operation of the operation of the Vietch diagram and the diagram of FIG. 3. In FIG. 5, the $T_{10}$ wave form signals produced by the ten microsecond one-shot 35, the $T_{20}$ by the twenty microsecond one-shot 36. The $T_x$ signal is then produced by the trailing edge of the waveform $T_{20}$. $T_x'$ then is the trailing waveform $T_x'$ of the rate setting oscillator 34. Included among the timing circuits are the pen delay flip-flops 37 which operate to provide the necessary timing signals for the pen up and pen down signals.

Although there have been described specific arrangements of a display system and methods in accordance with the invention for illustrating the manner in which the invention may be used to advantage, it will be appreciated that the invention is not limited thereto. Accordingly, any and all modifications, variations, or equivalent arrangements falling within the scope of the annexed claims should be considered to be a part of the invention.

I claim:

1. In a system for controlling the output of a digital computer having a plurality of input/output devices adapted to transmit data to or receive data from said digital computer, an incremental recorder having a relatively low input data rate than the output data rate of said digital computer, and a number of input terminals each controlling a different incremental movement, a plotter controller means responsive to one of said input/output devices for coupling said digital computer to said incremental recorder means to transmit data from said computer to said incremental recorder and to transmit data from said incremental recorder to said computer, said plotter controller means to include means for storing data from said computer, said data representing commands for said incremental recorder for energizing the three plotting mechanisms of said recorder.

2. In a system for controlling the output of a digital computer having a plurality of input/output devices adapted to transmit data to or receive data from said digital computer, an incremental recorder having a relatively low input data rate than the output data rate of said digital computer, and a number of input terminals each controlling a different incremental movement, a plotter controller means responsive to one of said input/output devices for coupling said digital computer to said incremental recorder means to transmit data from said computer to said incremental recorder and to transmit data from said incremental recorder to said computer, said plotter controller means to include means for disconnecting said computer from said incremental recorder after a predetermined time interval.

3. A system for controlling an incremental plotter in cooperative relationship with a high speed digital computer, the digital computer requiring response signals for the transmission of further data, comprising, means responsive to data from said digital computer for transferring commands to said plotter, means responsive to the initiation of transfer for releasing said digital computer at a fixed time interval thereafter, and means for preventing further data transfer during said time interval.

4. In a system for operating a digital incremental plotter having two operating rates in response to a digital computer providing successive output characters in binary coded decimal form and requiring response signals, the system comprising means responsive to said output characters from said digital computer for transferring converted instructions to said incremental plotter, and means responsive to the initiation of the transfer for releasing the digital computer at a first time thereafter.

5. A system for controlling an incremental plotter in cooperative relationship with a high speed digital computer, comprising control unit means responsive to a start signal from said digital computer for activating said incremental plotter, said control unit means including means responsive to said start signal for transmitting a data request signal to said digital computer a predetermined time interval after said start signal, said control unit means further including means responsive to a service out signal from said digital computer for driving said incremental plotter.

6. The system recited in claim 5 wherein said control unit means further includes means responsive to said service out signal for deactivating said incremental plotter a predetermined time after said service out signal.

7. The system recited in claim 5 wherein said control unit means further includes means for disconnecting said incremental plotter from said digital computer a predetermined time interval after said service out signal.

8. The system recited in claim 5 wherein said control unit means further includes mode control and phase control means for controlling said incremental plotter in response to signals from said digital computer.

References Cited

UNITED STATES PATENTS

| | | | |
|---|---|---|---|
| 3,126,635 | 3/1964 | Moldoon et al. | 33—18 |
| 3,199,111 | 8/1965 | Jennings et al. | 346—29 |
| 3,299,432 | 1/1967 | Cutler | 346—29 |

PAUL J. HENON, *Primary Examiner.*

RAULFE B. ZACHE, *Assistant Examiner.*

U.S. Cl. X.R.

346—29